United States Patent [19]

Lakshmanan

[11] 4,289,669

[45] Sep. 15, 1981

[54] ALKALI-SOLUBLE HOT MELT ADHESIVE COMPOSITIONS

[75] Inventor: Pallavoor R. Lakshmanan, Houston, Tex.

[73] Assignee: Gulf Oil Corporation, Pittsburgh, Pa.

[21] Appl. No.: 172,596

[22] Filed: Jul. 28, 1980

[51] Int. Cl.³ .................... C08L 93/00; C08L 93/04
[52] U.S. Cl. .................... 260/27 EV; 428/512; 260/27 R; 525/333
[58] Field of Search ............ 260/27 R, 27 EV, 104

[56] References Cited

U.S. PATENT DOCUMENTS

| | | | |
|---|---|---|---|
| 3,485,783 | 12/1969 | Kehe | 260/27 R |
| 3,896,069 | 7/1975 | Kosaka et al. | 260/27 EV |
| 3,912,709 | 10/1975 | Gould | 260/104 |
| 4,105,462 | 8/1978 | Thanos | 260/104 |
| 4,146,521 | 3/1979 | Godfrey | 260/27 R |
| 4,158,664 | 6/1979 | Selintz | 562/593 |

OTHER PUBLICATIONS

Royals–Advanced Organic Chemistry, Prentice-Hall, (Englewood Cliffs, N.J.), 1954, p. 410, Library of Congress 53-13142.

*Primary Examiner*—H. S. Cockeram
*Attorney, Agent, or Firm*—Richard L. Kelly

[57] ABSTRACT

Alkali-soluble hot melt adhesive compositions are provided which contain (a) about 10–40 weight % of an alkenyl succinic anhydride, (b) a carboxyl group containing ethylene copolymer, and (c) about 10–50 weight % of rosin.

6 Claims, No Drawings

ALKALI-SOLUBLE HOT MELT ADHESIVE COMPOSITIONS

BACKGROUND OF THE INVENTION

Hot melt adhesives frequently are employed to prepare laminated structures by bonding one paper sheet to another. Such laminated paper structures are widely employed in the manufacture of heavy-duty multiwall bags.

A problem associated with the use of paper laminates of the type described above is that the hot melt adhesives employed cause difficulties in reworking and recovering paper from the laminate scraps. It would be desirable to have available to the art a hot melt adhesive useful in the manufacture of paper laminates which could be removed from laminate scraps so that the paper content of such scraps could be reworked and recovered to prepare recycled paper.

SUMMARY OF THE INVENTION

The applicant has discovered hot melt adhesive compositions useful in laminating paper sheets together and which can be chemically removed from laminate scraps so that the paper can be recovered from such scraps and used to prepare recycled paper. The hot melt adhesive compositions of the invention contain three essential components. The first is an alkenyl succinic anhydride. The second is a carboxyl group-containing ethylene polymer. The third is a rosin.

DETAILED DESCRIPTION OF THE INVENTION

The compositions of the invention contain about 10-40, preferably 15-35, and more especially about 25 weight % of the alkenyl succinic anhydride. The carboxyl group-containing ethylene polymer is present in the amount of 30-50, preferably 35-45, and more especially about 40 weight % of the composition. The rosin is included in the compositions in the amount of about 10-50, preferably 15-45, and more especially about 30 weight % of the total composition. In the preferred embodiment of the invention, the three named components constitute the entire composition. Optionally, however, the compositions may contain up to about 20 weight % of additional components, provided that such optional components do not alter the alkali-solubility of the compositions of the invention as described infra. An antioxidant of the type conventionally employed with ethylene polymers desirably is included in the compositions.

The alkenyl succinic anhydride employed in the compositions of the invention are known compounds of the type described in U.S. Pat. No. 4,158,664, whose descriptions are incorporated herein by reference. These compounds are prepared by heating a high molecular weight alpha-olefin containing about 30 or more carbon atoms with maleic anhydride.

Frequently these compounds are prepared from a mixture of alpha-olefins in which each component contains a minimum of about 30 carbon atoms. Where mixtures of alpha-olefins are employed, the average number of carbon atoms contained therein seldom will be in excess of 52 and preferably will be less than about 42. The color of the compounds can be improved (lightened) by treatment with water.

The carboxyl group-containing ethylene copolymer preferably is an ethylene copolymer prepared by copolymerizing ethylene with acrylic or methacrylic acid. The copolymer may have a third monomer copolymerized therein with terpolymers of ethylene, vinyl acetate, and an appropriate acid monomer constituting a preferred component to be employed in the compositions of the invention. Methods for preparing such copolymers are known in the art and certain of such copolymers are commercially available. An alternative class of materials that can be employed in the invention consists of relatively low molecular weight ethylene polymers that have been oxidized to incorporate carboxyl groups therein. The ethylene polymer employed should have an acid number within a range of about 0.25-30 and preferably 1.0-20. For the purpose of the present specification and claims, the term "acid number" is defined as the milligrams of KOH required to neutralize one gram of polymer.

The rosins suitable for use in the compositions of the invention are those described in the *Kirk-Othmer Encyclopedia of Chemical Technology*, Interscience Publishers, Second Edition, Volume 17, pages 475-509. These include not only the natural occurring rosins, but the chemically modified rosins obtained by hydrogenation, isomerization, and the like. The rosin employed should have an acid number of at least about 100.

The compositions of the invention are solids at room temperature, but have melting points and melt viscosities in a range such that they can be readily applied to appropriate substrates using conventionally employed hot melt techniques and equipment. The compositions, depending upon their precise formulation, have ring and ball softening points within a range of approximately 65° to 85° C. The compositions of the invention can be formulated to have viscosities, at 400° F., from as low as about 500 cps to as high as 7000 cps or more.

A desirable characteristic of the compositions of the invention is that they readily dissolve or disperse in dilute alkaline solutions containing either fixed inorganic bases, such as sodium and potassium hydroxide, or amines such as triethanol-amine, dimethylaminoethanol, 2-amino-2-methylpropanol, etc. Thus, scraps of paper laminates bonded with the compositions of the invention can be steeped in dilute alkaline solutions to dissolve the adhesive. The paper scraps then can be reworked and recovered for conversion to recycled paper.

While the compositions of the invention are customarily employed as adhesives employing hot melt application techniques, it also was possible to employ the compositions as aqueous solutions or dispersions. Such dispersions are prepared by heating the compositions with an appropriate alkaline solution at an elevated temperature with vigorous agitation.

The following examples are set forth to illustrate more clearly the principle and practice of the invention to those skilled in the art. Where parts or percentages are mentioned, they are parts or percentages on a weight basis.

EXAMPLE 1

Several hot melt formulations were prepared from (a) an alkenyl succinic anhydride prepared from a C-30+alpha-olefin* and maleic anhydride by the procedure described in U.S. Pat. No. 4,158,664, (b) a terpolymer of ethylene, vinyl acetate and a polymerizable acid monomer, and (c) rosin. Fine particles of the components were first physically admixed at ambient temperature.

The physical admixture then was heated to a temperature of about 325° F. with stirring to provide a homogeneous mixture. An antioxidant in an amount of 0.5 weight % of the composition was included in the mixtures to prevent oxidation. The formulations prepared, the melt properties of the compositions, and the mechanical properties of the compositions are set forth in Table I. Corresponding data are shown for two controls, each of which contains two of the components included in the compositions of the invention.

*The alpha-olefin employed in the synthesis was a mixture in which the lowest molecular weight component contained 30 carbon atoms with the average component containing about 38 carbon atoms.

TABLE I

| Composition | A | B | C | D | Control A | Control B |
|---|---|---|---|---|---|---|
| Component | | | | | | |
| Ethylene Copolymer A (1) | 180 | 160 | 200 | —200 | 200 | — |
| Ethylene Copolymer B (2) | — | — | — | 140 | — | — |
| Rosin (3) | 180 | 160 | 100 | 140 | — | 200 |
| Alkenyl Succinic Anhydride | 40 | 80 | 100 | 120 | 200 | — |
| Antioxidant | 2 | 2 | 2 | 2 | 2 | 2 |
| Melt Properties | | | | | | |
| R&BSP, °C. (4) | 73–74 | 70–71 | 77–79 | 82 | 85–87 | 72–73 |
| Melt Viscosity, cps | | | | | | |
| @ 325° F. | 5600 | 3700 | 4875 | 16,000 | 4700 | 7600 |
| @ 350° F. | 3200 | 2400 | 3500 | 10,700 | 3000 | 4800 |
| @ 375° F. | 2400 | 1700 | 2500 | 7,800 | 2200 | 3100 |
| @ 400° F. | 1900 | 1200 | 1875 | 5,800 | 1700 | 2300 |
| Mechanical Properties | | | | | | |
| Tensile @ Yield, psi | 143 | 220 | 350 | 530 | 773 | 91 |
| Tensile @ Break, psi | 156 | 147 | 335 | 680 | 657 | 125 |
| % Elongation | 838 | 264 | 420 | 484 | 61 | 527 |
| Chemical Properties | | | | | | |
| Acid Number (5) | 99.5 (93.0) | 94.5 (91.8) | — | 100.7 (93.6) | — | — |

(1) Ethylene-vinyl acetate - acid terpolymer containing about 25 weight % vinyl acetate, having a melt index of about 150 and having an acid value of about 6 (mg of KOH per gram of polymer).
(2) Ethylene-vinyl acetate-acid terpolymer containing about 25 weight % vinyl acetate, having a melt index of about 6, and having an acid number of about 6 (mg of KOH per gram of polymer).
(3) Rosin supplied under trade designation Foral AX and having a R&BSP of 76° C. and an acid number of about 158.
(4) Ring and ball softening point.
(5) The acid number is the mg KOH required to neutralize 1 gram of polymer. The first value shown is the calculated acid number. The value in parenthesis is the experimental determined value.

Referring to the mechanical properties of Control A, it will be noted that its percent elongation is too low to provide a commercially acceptable hot melt adhesive. Referring to the mechanical properties of Control B, the tensile strength is too low to be a commercially acceptable hot melt adhesive. Tensile and elongation properties of compositions A, B, C, and D represent a good balance for a commercially acceptable hot melt adhesive.

Attention is directed to the viscosities of composition D. The values are substantially higher than the corresponding values for compositions A, B, and C. This results from the fact that the carboxyl group containing ethylene polymer included therein had a significantly lower melt index than the corresponding polymer included in compositions A, B, and C. This indicates that the viscosity of the compositions can be varied over a wide range by varying the melt index of the ethylene polymer component included in the compositions.

Attention is directed to the acid numbers shown in Table I. Two values are shown for each composition; the first value being the calculated value based upon the acid numbers of the individual components, with the second value included within parenthesis being an experimentally determined value. It is noted that the agreement between the calculated and experimentally determined values is quite good.

Each of compositions A, B, C, and D was employed as a hot melt adhesive to bond together two sheets of 40-pound kraft paper. The compositions were laid down as an adhesive bead having a ⅛" diameter, with the bead being applied at 350° F. using a Minimatic 350 gun. The adhesion was excellent. When laminates were pulled apart, fiber tear was observed.

Each of compositions A, B, C, and D readily dispersed in a 2% NaOH solution at 70° C. in a Gifford Woods mixer.

What is claimed:

1. An alkali-soluble hot melt adhesive composition consisting essentially of:
   (a) 10–30 weight % of an alkenyl succinic anhydride,
   (b) 30–50 weight % of an ethylene polymer having an acid number of about 0.25–30.0, and
   (c) 10–50 weight % of a rosin material selected from natural rosins, hydrogenated rosins and isomerized rosins;

said alkenyl succinic anhydride having been prepared by heating a high molecular weight alpha-olefin containing 30 or more carbon atoms with maleic anhydride.

2. A composition of claim 1 containing about 15–35 weight % of the alkenyl succinic anhydride, about 35–45 weight % of the ethylene copolymer, and about 15–45 weight % of the rosin material.

3. A composition of claim 1 in which the carboxyl group-containing ethylene polymer is a polymer of ethylene and acrylic or methacrylic acid.

4. A composition of claim 3 in which the ethylene polymer also has polymerized therein vinyl acetate.

5. A composition of claim 2 in which the carboxyl group-containing ethylene polymer is a copolymer of ethylene and acrylic or methacrylic acid.

6. A composition of claim 5 in which the ethylene polymer also has polymerized therein vinyl acetate.

* * * * *

UNITED STATES PATENT AND TRADEMARK OFFICE
CERTIFICATE OF CORRECTION

PATENT NO. : U.S. 4,289,669
DATED : September 15, 1981
INVENTOR(S) : Pallavoor R. Lakshmanan It is certified that error appears in the above-identified patent and that said Letters Patent are hereby corrected as shown below:

In TABLE I, Composition D contains zero (0) parts of Ethylene Copolymer A.

In TABLE I, Control B contains two hundred (200) parts of Ethylene Copolymer.

Signed and Sealed this

Twenty-fourth Day of November 1981

[SEAL]

Attest:

Attesting Officer

GERALD J. MOSSINGHOFF

Commissioner of Patents and Trademarks